United States Patent
Gonda

(10) Patent No.: US 10,509,300 B2
(45) Date of Patent: Dec. 17, 2019

(54) ELECTRICAL FIXTURE APPARATUS AND METHODS

(71) Applicant: Rumi S Gonda, Boxborough, MA (US)

(72) Inventor: Rumi S Gonda, Boxborough, MA (US)

( * ) Notice: Subject to any disclaimer, the term of this patent is extended or adjusted under 35 U.S.C. 154(b) by 0 days.

(21) Appl. No.: 16/038,438

(22) Filed: Jul. 18, 2018

(65) Prior Publication Data
US 2019/0033693 A1 Jan. 31, 2019

Related U.S. Application Data

(60) Provisional application No. 62/537,399, filed on Jul. 26, 2017.

(51) Int. Cl.
| | | |
|---|---|---|
| G03B 17/56 | (2006.01) | |
| H02G 3/38 | (2006.01) | |
| H02G 3/04 | (2006.01) | |
| H02G 3/10 | (2006.01) | |

(52) U.S. Cl.
CPC ......... *G03B 17/561* (2013.01); *H02G 3/0406* (2013.01); *H02G 3/10* (2013.01); *H02G 3/0437* (2013.01); *H02G 3/38* (2013.01)

(58) Field of Classification Search
USPC .......................................................... 396/428
See application file for complete search history.

(56) References Cited

U.S. PATENT DOCUMENTS

| | | | | |
|---|---|---|---|---|
| 6,259,475 | B1* | 7/2001 | Ramachandran | B60Q 1/0023 348/117 |
| 7,619,508 | B2* | 11/2009 | Lynam | B60K 35/00 340/438 |
| 8,614,673 | B2* | 12/2013 | Binder | G01S 3/7864 345/158 |

* cited by examiner

*Primary Examiner* — Clayton E. LaBalle
*Assistant Examiner* — Warren K Fenwick

(57) ABSTRACT

An electrical fixture apparatus is provided to install devices on an electrical wiring component. In some embodiments, a fixture apparatus is provided for installing a camera using at least one conduit, one of which has a fastening end on one end, and a camera housing attached to a conduit on the other end. The camera in the camera housing provides support to be remotely reset using a sequence of power off on within a certain time interval. In further embodiments, a fixture apparatus is provided for installing a device on an electrical wiring component. The fixture apparatus may comprise at least one conduit, which has a fastening end on one end, and has a base at the other end. The fixture apparatus preferably supports the installation of an off the shelf device on its base.

20 Claims, 4 Drawing Sheets

ELECTRICAL FIXTURE APPARATUS AND METHODS

CROSS-REFERENCE TO RELATED APPLICATIONS

This application claims the priority to and the benefit of U.S. Provisional Application No. 62/537,399, filed Jul. 26, 2017, which is incorporated herein by reference in its entirety.

FIELD OF THE INVENTION

The present invention relates generally to field of fixtures, and more specifically an improved electrical fixture to install devices on.

BACKGROUND

Currently, residential and commercial properties have motion sensor light fixtures installed for security, safety, etc., reasons. There are many motion sensor light fixtures without cameras already installed which are working, and do not need to be replaced.

Additionally, a separate independent standalone fixture apparatus has advantage that it does not need to be replaced, and configured every time the motion sensor lights fixtures fail. Cameras typically require some setup, and configuration which can be complicated, and once installed the property owner may not want to change it. In an integrated motion sensor light fixture with camera, the camera would need to be setup, and configured again when a new integrated motion sensor light fixture with camera has to be installed.

The motion sensor light fixtures are already installed at strategic locations, and already have the wiring, and electrical boxes installed. Currently, one can install another device for example, a camera, etc., near the motion sensor light fixture by adding another electrical box near it, and connecting the two boxes with various conduits, conduit connectors, conduit adapters, etc. Then installing the device on a second electrical box. There is a need for a fixture apparatus that can simplify the installation of additional devices, that can be quick, easily, and at a lower cost by directly installing the devices on the existing electrical box, taking advantage of the existing wiring and electrical box, and not have to install another wiring connection, and electrical box.

Currently, when a residential or commercial property owner needs to install a device, for example, a camera, etc., on the outside they have to install at minimum an electrical box at the desired location, and bring wiring to that area, which may require additional conduits, conduit connectors, conduit adapters, etc. to install to code. In order to place the camera in a safe, secure, and inconspicuous location, the camera is installed in a difficult to reach location. Additionally, the owner may have to install a new circuit to bring the power to the camera location. Furthermore, currently, of the self standalone cameras provide a non-weatherproof power adapter/supply which would require them to be installed in protected location or box. It would be very convenient, and useful to be able to add a device, for example, a camera, without having to install additional wiring, conduits, weatherproof electrical box, etc.

Thus, there remains a considerable need for devices and methods for simplified, quick, easy, safe, and lower cost way to install devices, for example, a camera, etc.

BRIEF SUMMARY OF THE INVENTION

There is a need in the art for a device to be able to do a simple, quick, easy, and lower cost install of electrical devices. The present invention is directed toward further solutions to address this need.

An electrical fixture apparatus is provided which is configured to install devices on an electrical wiring component. In some embodiments, the fixture apparatus may comprise at least one conduit and a base.

Among the many different possibilities contemplated, in some embodiments, the base can be a camera housing with a camera. The camera may be wired or wireless. The camera housing may have an internal or external antenna. The camera may include a microphone and/or a speaker. The base may be generally flat in shape or in the shape of an electrical box, or other shapes, to facilitate the installation of one or more off the shelf devices. An off the shelf device can be, for example, a camera.

It is still further contemplated that the fixture apparatus can be made of metallic or non-metallic materials, there can be one or more conduits. In some embodiments, a conduit can be fixed or adjustable. The fastening end can be installed using various fastening systems, for example, a threading, and a locknut, a tab, a clamp, etc. The fastening end can be installed directly into a threaded outlet of an electrical box. The fixture apparatus can be installed on electrical wiring components, for example, an electrical box, a conduit, a connecter, or an adapter, etc. In further embodiments, the fixture apparatus's fastening end section without any non-fastening section of the conduit can be directly connected to the base. The fixture apparatus can be made of one or more pieces. The fixture apparatus may use different voltages. The fixture apparatus may use Alternating Current (AC) or Direct Current (DC). The fixture apparatus may use an external storage system. The fixture apparatus may obtain power from different types of power supply system.

In accordance with another aspect of the present invention is directed towards a method to reset a camera installed on the fixture apparatus is provided.

Among the many different possibilities contemplated, the camera can be reset be a certain sequence of power off on within a certain time interval, for example, the power can be turned off on off on off on within a five second time interval.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
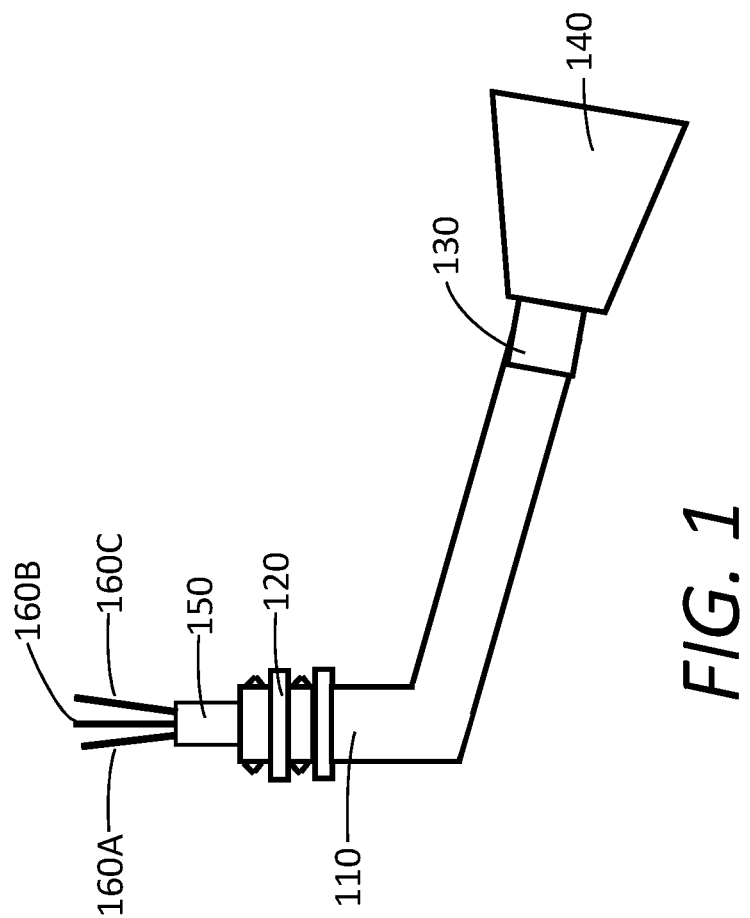
FIG. 1 is a diagrammatic illustration of an example of an electrical fixture apparatus according to various embodiments described herein.

In accordance with the teachings of the present invention, an electrical fixture apparatus to install devices on an electrical wiring component is provided.

For the purposes of the present invention, the term "electrical wiring component" may refer to conventional electrical boxes, junction boxes, conduits, connectors, adapters, fittings, etc.

For the purposes of the present invention, the term "electrical box" may refer to conventional electrical boxes.

FIGS. 1 through 4, wherein like parts are designated by like reference numerals throughout, illustrate example embodiments of an electrical fixture apparatus, sometimes referred to as "fixture apparatus" or "the apparatus", which can be installed on an electrical wiring component according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, including the size, shape, or type of elements or materials, in a manner still in keeping with the spirit and scope of the present invention.

FIG. 1 illustrates one example implementation of an electrical fixture apparatus. In some embodiments, a fixture apparatus may comprise a conduit 110 with a fastening end section using a fastening system preferably comprising, for example, a threading, and a locknut 120, and a flange which can be used to install on an electrical wiring component, for example, into an outlet of an electrical box, and fastened in place using the locknut 120 on the inside of the electrical box. In other embodiments, any other suitable fastening method may be used. On the other end of the conduit 110 is an adjustable conduit 130 which preferably can swivel. A camera housing 140 may be attached on the other end of the adjustable conduit 130. The camera housing 140 may include a camera inside.

An electrical cable 150 with a one or more wires 160A, 160B, and 160C which can be used to make the electrical connections. The wires 160A, 160B, and 160C may be used to make the electrical connections to provide power, and ground protection to the camera housed in the camera housing 140. Additional wiring can also be installed, including cable(s) for video, audio, communications, etc.

One of ordinary skill in the art will appreciate that the invention is not restricted to these conditions, and that other options can be utilized. The fixture apparatus can be made of metallic or non-metallic materials. In some embodiments, there can be one or more conduits in the fixture apparatus based on the flexibility to adjust the angle, and direction, and/or other design requirements. The conduits 110, and 130, and the camera housing 140 can be constructed as one piece or of multiple pieces. The fixture apparatus can be such that the camera housing 140 can be connected directly to the fastening end section of the conduit 110 without any non-fastening section. The fixture apparatus is not restricted to being flexible, including rotating or swiveling, etc., and can be fixed. The camera housing 140, and the camera are not restricted to being a box shape, and can be other shapes, including a cylindrical shape, a dome shape, etc. The fastening system to hold the fixture apparatus is not restricted to a threading, and a locknut system, other fastening systems, including a tab, a clamp, etc., can also be used. The diameter of the fastening end section of the conduit 110 can be comprised of a size so that the conduit 110 can be directly inserted into the outlet of the electrical box on which the conduit 110 is being installed and fastened using a fastening system, or the conduit 110 can be threaded into the outlet's threads of the electrical box on which the conduit 110 is being installed without using another fastening system. The fixture apparatus is not restricted to being installed on the electrical box, and can be installed on other electrical wiring components, including a conduit, a connecter, an adapter, etc., or on any other structure or object. The fixture apparatus may use different voltage, for example, 110 volts, 220 volts, 5 volts, 12 volts, 24 volts, etc. The fixture apparatus can use Alternating Current (AC) or Direct Current (DC). The fixture apparatus may include an external storage system, for example, a MicroSD card system. The fixture apparatus may obtain power from an electric, a battery system, a solar power system, etc.

Figure 2:
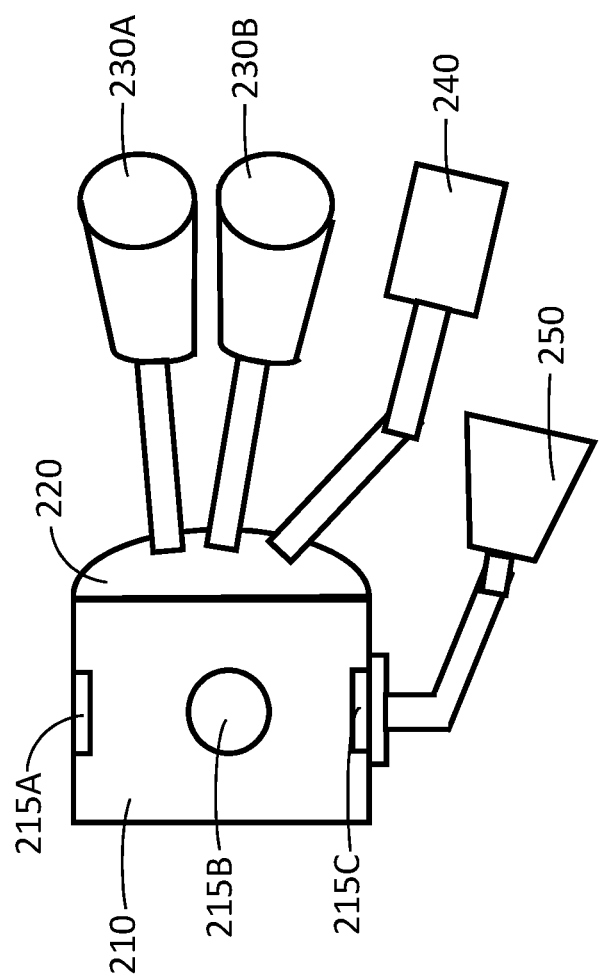
FIG. 2 is a diagrammatic illustration of an example electrical fixture apparatus installed on an electrical wiring component according to various embodiments described herein.

FIG. 2 illustrates one example implementation of an installation of a fixture apparatus on an electrical wiring component, for example, an electrical box. A fixture apparatus 250 can be installed on an electrical wiring component, for example, an electrical box 210 in an outlet 215A, 215B, and 215C. For example, the fastening end of the conduit 210 can be inserted into the electrical box 210 in the outlet 215C, and fastened in place, for example, by a locknut inside the electrical box as described previously in FIG. 1. The cables, and wires of the fixture apparatus 250 may be positioned inside the electrical box 210, and appropriate wire connections can be made for the camera.

A motion sensor light fixture comprises of a fixture base 220, one or more light housings 230A, and 230B, and a motion sensor housing 240. The motion sensor light fixture may be installed on the electrical box 210. The motion sensor light fixture can be controlled by an electrical switch. The power to the motion sensor light fixture can be left on. The motion sensor lights 230A, and 230B are activated by motion sensed, and based on the light sensed by a motion sensor in the motion sensor housing 240 as configured in the motion sensor light fixture.

The fixture apparatus 250 may be mounted at remote, difficult, and dangerous to reach locations. There may be a need to reset the camera without having to physically/locally reset it in case of problems or to reconfigure the camera settings. In order for the camera to be remotely reset, one exemplary method of resetting the camera remotely may comprise turning the power off on in a certain sequence within a certain time interval, for example, the power can be sequenced off and on three times (off on off on off on) within a five second time interval, although other sequences and time intervals may be used. If the sequence occurs within the time interval the camera may be reset. Once reset, the camera can be reconfigured. This method can be used even when the camera is not responding to other methods.

Figure 3:
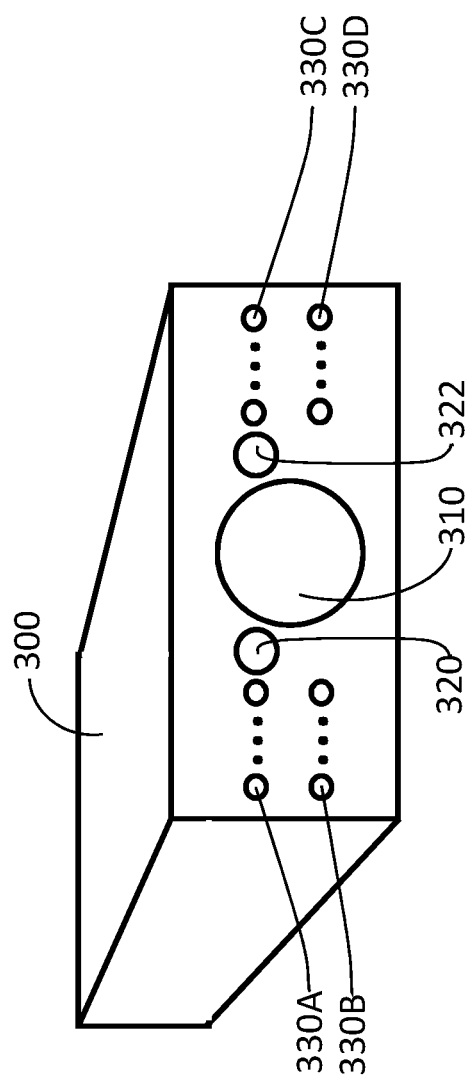
FIG. 3 is a diagrammatic illustration of an example of a camera housing according to various embodiments described herein.

FIG. 3 illustrates one example implementation of a camera housing. A camera housing 300 may include a camera built into or otherwise coupled to it. The camera internally may comprise a processing electronics board, power supply board, etc. Additionally, the camera may comprise a camera lens 310, one or more indicator lights 320, one or more light sensors 322, and one or more lights 330A, 330B, 330C, and 330D for night vision. The camera may be wired or wireless. The camera housing 300 may have an internal or external antenna for wireless communications. The camera may include microphone and speaker for audio communications.

Figure 4:
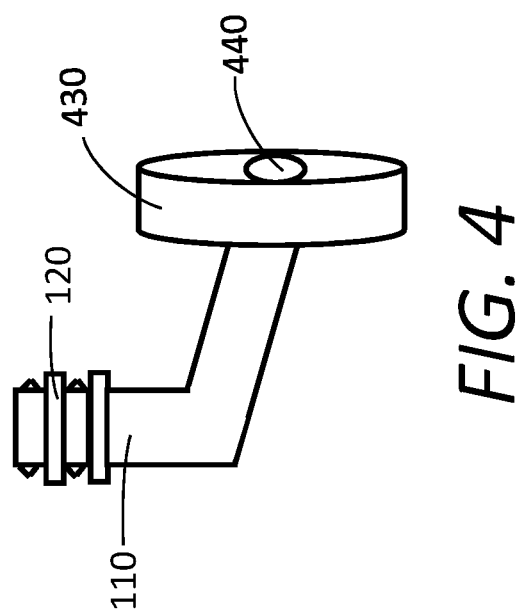
FIG. 4 is a diagrammatic illustration of an example of an electrical fixture apparatus to install devices on an electrical wiring component according to various embodiments described herein.

FIG. 4 illustrates another example implementation of a fixture apparatus to install a device on an electrical wiring component, for example, an electrical box. In this and in some embodiments, a fixture apparatus may comprise of a conduit 110 with a fastening end section using a fastening system comprising of a threading, and a locknut 120, and a flange which can be used to install on an electrical wiring component, for example, into an outlet of an electrical box, and fastened in place using the locknut 120 on the inside of the electrical box. On the other end of the conduit 110 may be a base 430 to install an off the shelf device, for example, a camera. The base 430 may have an opening 440 to the conduit 110 for electrical cable, wires, power adapter/supply cable, and/or video, audio, communication cable, etc., to be passed through.

One of ordinary skill in the art will appreciate that the invention is not restricted to these conditions, and that other options can be utilized. The fixture apparatus can be made of metallic or non-metallic materials. The conduit 110, and the base 430 can be made of one piece. In some embodiments, there can be one or more conduits in the fixture apparatus based on the flexibility, and/or other design requirements. The fixture apparatus can be such that the base 430 can be connected directly to the fastening end section of the conduit 110 without any non-fastening section. The fixture apparatus is not restricted to being flexible, including rotating or swiveling, etc., and can be fixed. The base 430 can a flat shape or be in the shape of an electrical box. If an external power adaptor is provided with the off the shelf adapter, it can be installed in the built-in or a separate electrical box on the base 430. The base 430 is not restricted to being vertical, and can be of other angles, including horizontal, etc. The base 430 can be of any shape, including round, square, etc. The fastening system to hold the fixture apparatus is not restricted to a threading, and a locknut system, as other fastening systems, including a tab, a clamp, etc., can also be used. The diameter of the fastening end section of the conduit 110 can comprise a size so that the conduit 410 can be directly inserted into the outlet of the electrical box on which the conduit 110 is being installed and fastened using a fastening system, or the conduit 110 can be threaded into the outlet's threads of the electrical box on which the conduit 110 is being installed without using another fastening system. The fixture apparatus is not restricted to being installed on the electrical box, and can be installed on other electrical wiring components, including a conduit, a connecter, an adapter, etc., or on any other structure or object. The fixture apparatus may use different voltage, for example, 110 volts, 220 volts, 5 volts, 12 volts, 24 volts, etc. The fixture apparatus may use Alternating Current (AC) or Direct Current (DC). The fixture apparatus may obtain power from an electric, a battery system, a solar power system, etc.

The present invention advantages include, without limitations, combining of several electrical wire components into a prebuilt fixture apparatus that simplifies the installation process for installing devices, by taking advantage of the existing electrical wiring components, thereby eliminating the need for the installation to be constructed from additional fittings using various individual conduit pieces, conduit connectors, conduit adapters, an electrical box, etc.

Additionally, in some embodiments of the present invention, a simplified fixture apparatus is provided which is configured to be able to do a quick, easy, and lower cost install of the fixture apparatus.

Additionally, the camera in the fixture apparatus can be remotely reset without having to physically reach remote, difficult, and dangerous to reach locations.

Additionally, an independent standalone fixture apparatus has advantage that there is no need to replace many existing, already installed working motion sensor light fixtures.

Additionally, a separate independent standalone fixture apparatus has advantage that it does not need to be replaced, and configured every time the motion sensor lights fixture fails and needs to be replaced. Camera's need to be setup, and configured which can be complicated, and once installed the property owner may not want to change it. In an integrated motions sensor light fixture with camera, the camera would need to be setup, and configured again when a new integrated motion sensor fixture with camera has to be installed.

Additionally, in further embodiments of the present invention, a prebuilt fixture apparatus to install an off the shelf device, for example, a camera, etc., has the advantage that it simplifies the installation process for installing the off the shelf device, which would otherwise have need for the installation to be constructed from additional fittings using various individual conduit pieces, conduit connectors, conduit adapters, and an electrical box, etc.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. An electrical fixture apparatus, the apparatus comprising:
   a. a conduit; and
   b. a camera housing;
   c. wherein the conduit comprises a fastening end;
   d. wherein the conduit can be installed on an electrical wiring component;
   e. wherein the camera housing can be connected to one of the conduit;
   f. wherein the camera housing can comprise a camera; and
   g. wherein, for example, the fastening end comprises a threading and can be installed by fastening the threading to the electrical wiring component, comprising an electrical box with threaded outlets.

2. The apparatus of claim 1, wherein the conduit can be fixed, and/or adjustable.

3. The apparatus of claim 1, wherein the fastening end can be installed using a fastening system.

4. The apparatus of claim 1, wherein the fastening end comprises a fastening system comprising of, for example, a threading, and a locknut, a tab, or a clamp.

5. The apparatus of claim 1, wherein the fastening end comprises a threading and can be installed directly by fastening the threading to the electrical wiring component, comprising an electrical box with threaded outlets.

6. The apparatus of claim 1, wherein the electrical wiring component comprises, for example, an electrical box, a conduit, a connecter, or an adapter.

7. The apparatus of claim 1, wherein the apparatus can be made of one piece.

8. A method to reset a camera in an electrical fixture apparatus after detecting a certain power sequence within a certain time interval, comprising the steps of:
   a. turning power off, and on in the certain power sequence; and b. checking the sequence occurred within the certain time interval.

9. The method of claim 8, wherein the certain power sequence comprises of turning the power off on off on off on.

10. The method of claim 8, wherein the certain time interval comprises of five seconds.

11. An electrical fixture apparatus, the apparatus comprising:
   a. a conduit; and
   b. a base;
   c. wherein the conduit comprises a fastening end;
   d. wherein the conduit can be installed on an electrical wiring component;
   e. wherein the base can be connected to one of the conduit;
   f. wherein the base includes an opening;
   g. wherein a device can be installed on the base; and
   h. wherein, for example, the fastening end comprises a threading and can be installed by fastening the threading to the electrical wiring component, comprising an electrical box with threaded outlets.

12. The apparatus of claim 11, wherein the fixture apparatus may be made of metallic or non-metallic materials.

13. The apparatus of claim 11, wherein the device installed on the base can be an off the shelf device, for example, a camera.

14. The apparatus of claim 11, wherein the conduit can be fixed, and/or adjustable.

15. The apparatus of claim 11, wherein the fastening end can be installed using a fastening system.

16. The apparatus of claim 11, wherein the fastening end comprises a fastening system comprising of, for example, a threading, and a locknut, a tab, or a clamp.

17. The apparatus of claim 11, wherein the fastening end comprises a threading and can be installed directly by fastening the threading to the electrical wiring component, comprising an electrical box with threaded outlets.

18. The apparatus of claim 11, wherein the electrical wiring component comprises, for example, an electrical box, a conduit, a connecter, or an adapter.

19. The apparatus of claim 11, wherein the fixture connector device can be made of one piece.

20. An electrical fixture apparatus, the apparatus comprising:
   a. a conduit; and
   b. a base;
   c. wherein the conduit comprises a fastening end;
   d. wherein the conduit can be installed on an electrical wiring component;
   e. wherein the base can be connected to one of the conduit;
   f. wherein the base includes an opening;
   g. wherein a device can be installed on the base; and
   h. wherein, for example, the base comprises a form comprising, for example, a flat shape, or in the shape of an electrical box.

* * * * *